United States Patent
Maroth

[11] 3,935,750
[45] Feb. 3, 1976

[54] COUNTERBALANCED MECHANICAL SPEED-CHANGE MECHANISM

[76] Inventor: Arthur M. Maroth, Marath Engineering Co., Gruman Hill Road, Wilton, Conn. 06897

[22] Filed: Oct. 23, 1973

[21] Appl. No.: 408,931

[52] U.S. Cl. ................................................ 74/61
[51] Int. Cl.² ........................................ F16H 33/00
[58] Field of Search ............... 74/18.1, 61, 804, 805

[56] References Cited
UNITED STATES PATENTS

| | | | |
|---|---|---|---|
| 2,149,321 | 3/1939 | Taylor et al. | 74/60 |
| 2,305,505 | 12/1942 | Wagner | 74/18.1 |
| 2,635,484 | 4/1953 | Karow | 74/60 |
| 3,196,698 | 7/1965 | Liddington | 74/60 |

FOREIGN PATENTS OR APPLICATIONS

| | | | |
|---|---|---|---|
| 827,441 | 1/1952 | Germany | 74/60 |

Primary Examiner—Samuel Scott
Assistant Examiner—Wesley S. Ratliff, Jr.
Attorney, Agent, or Firm—H. Gibner Lehmann; K. Gibner Lehmann

[57] ABSTRACT

A speed change mechanism comprising essentially a nutator member carried and driven by a shaft having an oblique hub which mounts the member and effects the nutating movement thereof. On each of its two sides the nutator member has rotary members coaxial with the shaft, one such member delivering the output power to a second shaft aligned with the first whereas the other rotary member is normally held stationary. The rotary and nutator members have cooperable teeth or shoulders of special shape, those on the nutator member being preferably in the form of tapered rollers whereas the shoulders on the rotary members have the shape of tooth formations. The input shaft which drives the nutator member has a pair of weights so arranged as to oppose the tendency for the member to flex the shaft during rotation of the latter. Vibration of the mechanism is thereby reduced. The tapered rollers of the nutator member are spring biased axially in a manner to yieldably maintain them in engagement with the teeth of the two rotary members, thereby eliminating looseness or lost motion and obviating the necessity for maintaining ultra-critical tolerances. That one of the rotary members which is considered to be the "stationary" one, can have a turning movement imparted to it by a speed-controlled device, thereby to effect a change in the ratio of the mechanism, or it can be coupled to the stationary casing by a releasable clutch to enable it to have free wheeling. In the latter case, an additional rotary member is provided, concentric with the clutched member and also cooperable with the nutator member, said second rotary member being also connected by means of a clutch device to the stationary casing. By maintaining one or the other of the two clutched members stationary while the other is permitted free movement, a selection of either of two speed ratios can be had.

20 Claims, 10 Drawing Figures

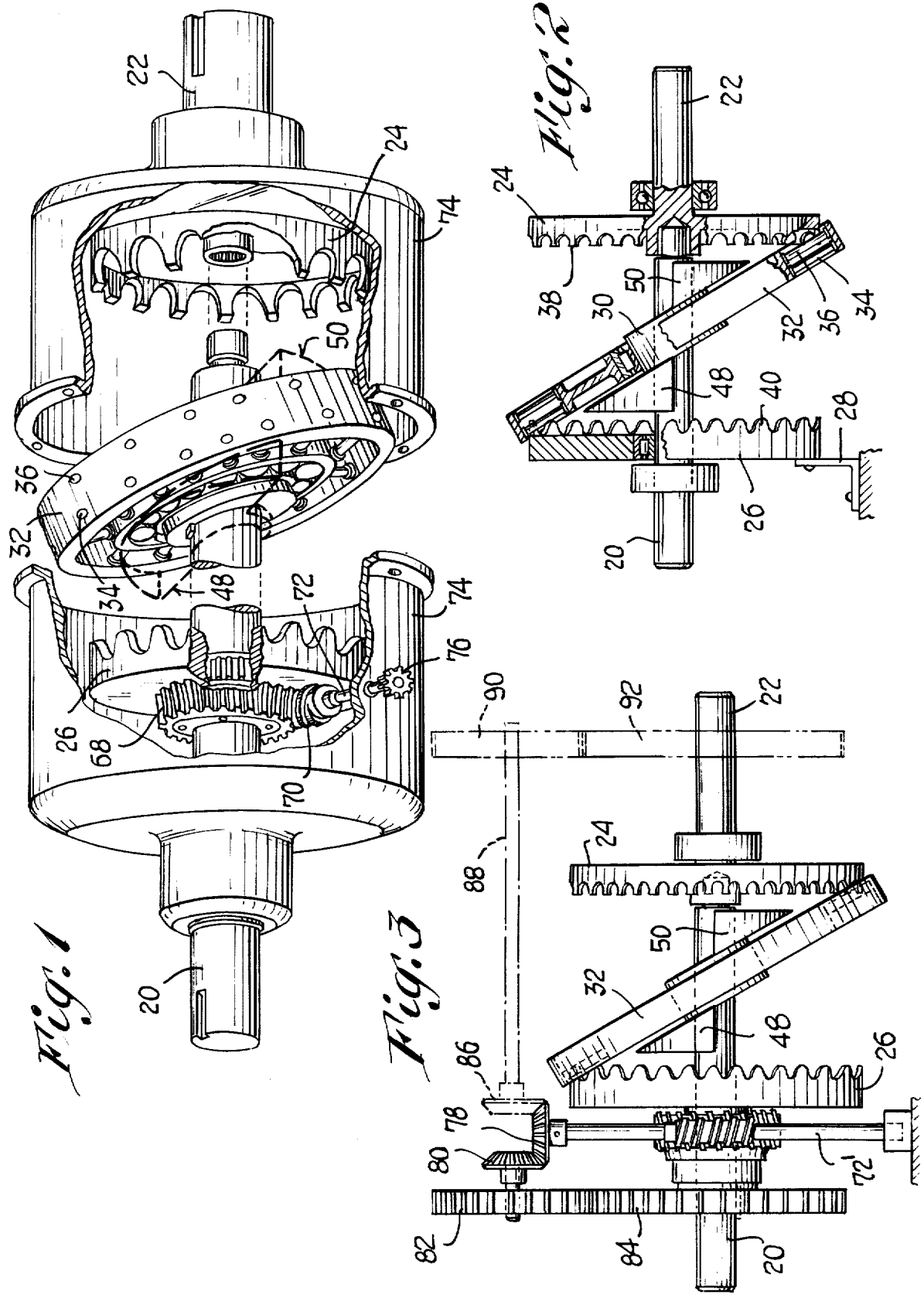

COUNTERBALANCED MECHANICAL SPEED-CHANGE MECHANISM

No Cross References To Related Applications

BACKGROUND

This invention relates to mechanical speed reducing devices of the type employing a nutator member which has imparted to it a nutating movement by a drive shaft, such member being cooperable with toothed rotary members one stationary and the other turnable, to effect a transmission and reduction in speed.

Various types of speed-reducing devices of the above nature have been proposed and produced in the past. One drawback of such devices has resided in the nutating nature of the movement imparted by the input or drive shaft to the nutator. This has resulted in considerable stresses and vibration, and has severely limited the upper limit of operating speeds of the mechanisms and also placed limitations on the sizes of the components, involving requirements as to minimum size, weight, etc. Another drawback of prior nutator-type speed reducers has involved the extreme accuracy that was required in forming or machining the cooperable parts, particularly the nutator member and the rotary members engageable therewith. Slight variations of dimensions resulted in looseness, lost motion, hammering and excessive wear. Still another drawback of prior speed reducers of the type indicated resulted in the fact that the ratio of the input to the output speed was fixed for any given mechanism, and could not be conveniently altered to enable a selection of different speeds or ratios to be had.

SUMMARY

The above disadvantages and drawbacks of prior nutator-type speed reducers are obviated by the present invention, which has for one object the provision of an improved nutator-type speed changer wherein a balancing of forces is had so as to effectively eliminate or minimize vibration and enable higher speeds to be obtained with corresponding reduction in strengths and weights of the main components. A related object is to provide an improved speed reducer as above, wherein looseness and lost motion between the coengaging components are effectively eliminated without resorting to extremely precise machining operations and tight tolerances. Still another object is the provision of an improved nutator-type speed reducer wherein different ratios between the input and output speeds can be readily obtained from the same mechanism.

The foregoing objects are accomplished by a novel mechanism comprising a shaft, a nutator member which nutates in response to turning of the shaft, in conjunction with rotary members cooperable with the nutator member, the said shaft being provided with a unique weight or counterbalance means which acts on the latter as it rotates, to oppose the longitudinal shaft-flexing tendency of the nutating member. Two oppositely-arranged weights are provided, carried by the shaft at opposite ends of an oblique hub on which the nutator member is turnably carried. The stresses imposed on the shaft by the turning of the latter and movement of the nutator member are opposed and balanced out by the weights, thereby minimizing vibration and reducing mechanical stresses in the components. The nutator member has tapered rollers which are engageable with teeth of the cooperable rotary members, and such rollers are spring-biased axially in a manner to yieldably hold them in engagement with the cooperable teeth, thereby eliminating looseness and lost motion, and obviating the necessity for tight tolerances. Also, one of the toothed rotary members (that normally thought of as being the stationary member) is connected by means of a releasable clutch to the casing in such a manner that it can be held stationary with the casing or else released for free wheeling movement. Concentric with such "stationary" rotary member is another rotary member, also engageable with the nutator and also coupled by means of a releasable clutch to the stationary housing. Thus, one or the other of such concentric rotary members can be released while the other is maintained stationary thereby to enable a selection of different speed ratios to be had. Additionally, the normally stationary rotary member can be geared to an adjustable drive device by which it can be driven in one direction or the other at different speeds, thereby providing an infinitely variable change in the speed ratio of the mechanism.

The various components are of relatively simple construction, and are arranged in a compact organization by which the overall size and weight of the speed change mechanism is held to a minimum. In addition to the higher speeds possible, the reduction or elimination of lost motion, and the minimizing of vibration, still other features and advantages will hereinafter appear.

In the accompanying drawings:

FIG. 1 is an exploded perspective view of the present improved nutator-type speed reduction mechanism, portions of the outer stationary casing being broken away to reveal interior details.

FIG. 2 is a diagrammatic representation of a simplified version of the speed reducing mechanism of the invention, given for the purpose of facilitating an understanding of the principles.

FIG. 3 is a diagrammatic representation of a simplified mechanism, given for the purpose of illustrating in a simple manner another embodiment of the invention.

Figure 9:
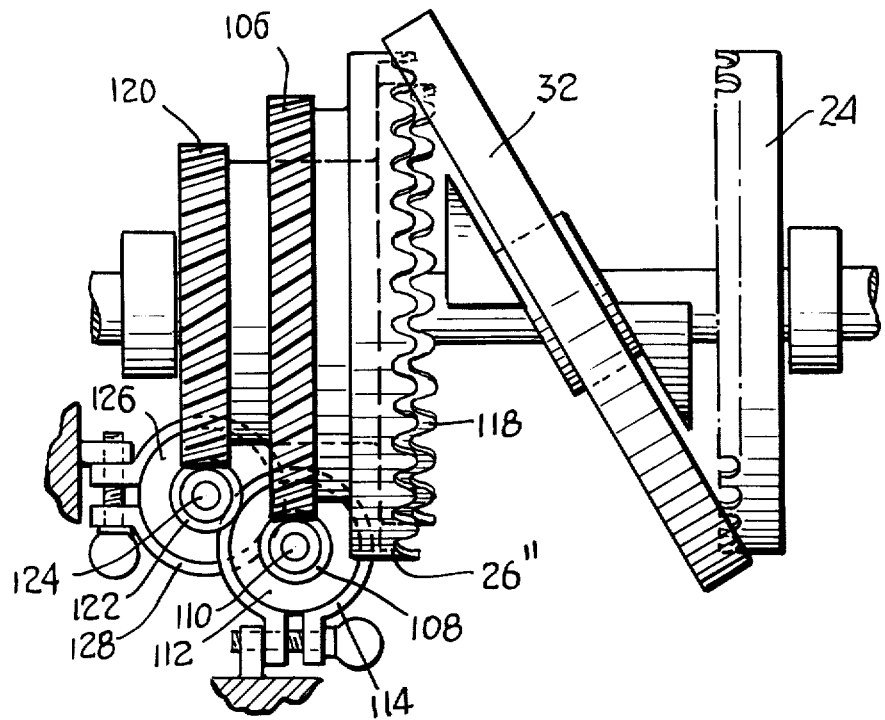

FIG. 9 is a fragmentary diagrammatic showing of a speed change mechanism constituting another embodiment of the invention wherein two concentrically-mounted rotary members are disposed on one side of the nutator, such two rotary members being coupled by releasable clutch devices to enable them to be either maintained stationary or else allowed to have free wheeling whereby the speed ratio of the mechanism can be changed.

Figure 10:
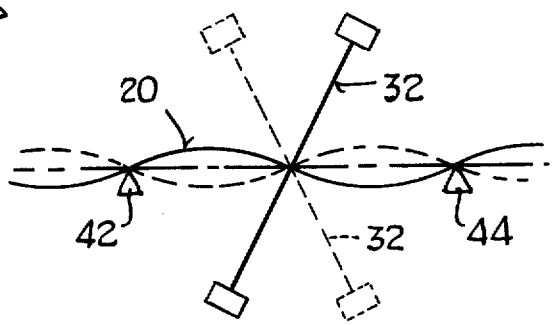

FIG. 10 is a diagrammatic representation of the drive shaft and nutator member, illustrating the flexing forces.

Considering first the simplification illustrated in FIG. 2, there is shown an input shaft 20 turnably connected to an aligned output shaft 22 which latter carries a toothed rotary member 24. Around the input shaft 20 is a second toothed rotary member 26 which is normally thought of as being stationary (this being indicated by its connection with a stationary bracket 28). The input or drive shaft 20 carries an obliquely arranged hub 30 on which is turnably mounted a nutator ring or member 32 having two circular rows of rollers 34, 36 which are respectively engageable with the rotary members 26, 24. The member 24 has teeth 38 engageable with the rollers 36, and the member 26 has teeth 40 engageable with the rollers 34. The number of teeth 40 is different from the number of teeth 38 whereby input power applied to the shaft 20 at a given speed will result in the output shaft 22 being driven at a much lower speed. It will be understood that the nutator member 32 is prevented from turning by virtue of its engagement with the stationary "rotary" member 26, and that its movement is accordingly a progressive wobbling which is known as a nutating-type movement. Such wobbling movement of the nutator will, by virtue of its engagement with the rotary member 24, impart a turning movement to the latter at a greatly reduced speed as compared with the speed of turning of the shaft 20 and hub 30.

The nutating movement of the member 32 imparts stresses to the input shaft 20 which tend to cause longitudinal flexing of portions of the shaft, this being diagrammatically illustrated in FIG. 10. In this figure the shaft 20 is indicated by a wavy line representing its flexed condition due to the movement of the nutator member 32. The bearings for the shaft 20 are indicated at 42, 44 with the latter being the socket provided in the output shaft 22 as seen in FIG. 2. In FIG. 10 a second position of the nutator member 32 is indicated in broken outline, as well as the corresponding oppositely flexed condition of the shaft 20.

In accordance with the present invention, counter weight means are provided on the shaft 20 to oppose the longitudinal shaft-flexing tendency of the nutating means. Referring to FIG. 2 the shaft 20 is provided with weights 48, 50 which are seen to have a wedge-like cross section, and to be of semi-circular configuration. Another showing of the weights 48, 50 is given in broken outline in FIG. 1, and an additional illustration is found in FIG. 6. In this latter figure the weights 48, 50 are carried respectively on hubs 52, 54 disposed on the shaft 20 at the opposite ends of the oblique hub 30 which carries the nutator 32. We have found that by the provision of such counter balance weights 48, 50 there is greatly minimized the tendency for flexing of the shaft 20, however minute, and also greatly minimized any unbalance resulting from the nutating movement of the nutator 32, all to the end that vibration is markedly reduced and in many cases almost totally absent, even at high operating speeds and under considerable loading.

Figure 4:
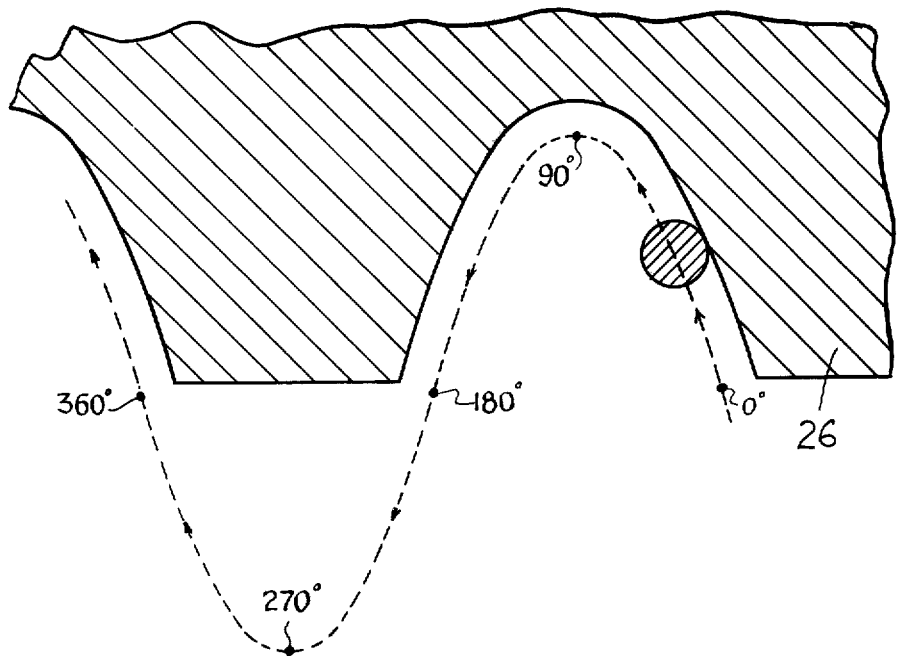
FIG. 4 is a fragmentary sectional layout illustrating a tooth shape of the normally stationary rotary member, and indicating the path of travel of one roller of the nutator.
Figure 5:
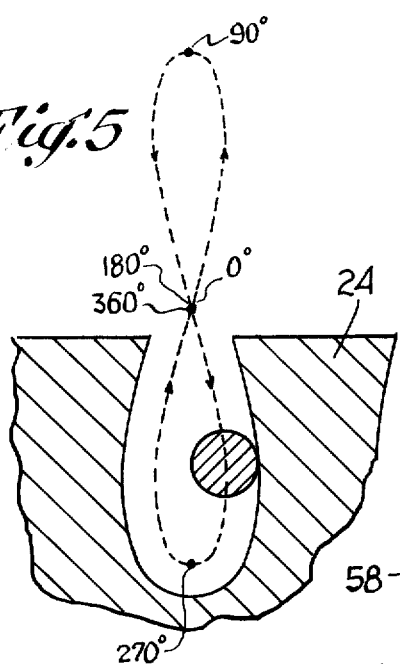
FIG. 5 is a fragmentary sectional layout of the tooth structure of the other rotary changer (or driven) member, illustrating the path of travel of a roller carried by the nutator member.
Figure 6:
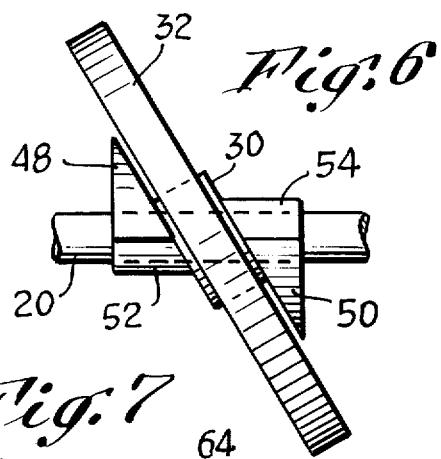
FIG. 6 is an edge elevational view of the nutator member, the oblique hub carrying the same, and the counter weights provided on the shaft, adjacent the oblique hub.

While the weights 48, 50 are illustrated as being semicircular and as having a wedge-like cross section it will be understood that other shapes and configurations are possible. That illustrated is of advantage in that a considerable amount of mass can be concentrated in the available space. The weights 48, 50 have a fixed relation with respect to the disposition of the hub 30, as will be understood, for the reason that the weights tend to oppose the stresses due to the placing of the hub 30 in its oblique position. The relationship is well illustrated in FIGS. 1, 2 and 6, showing that the inner and largest planar surfaces of the weights generally lie in the same planes as the end surfaces of the hub 30.

Figure 7:
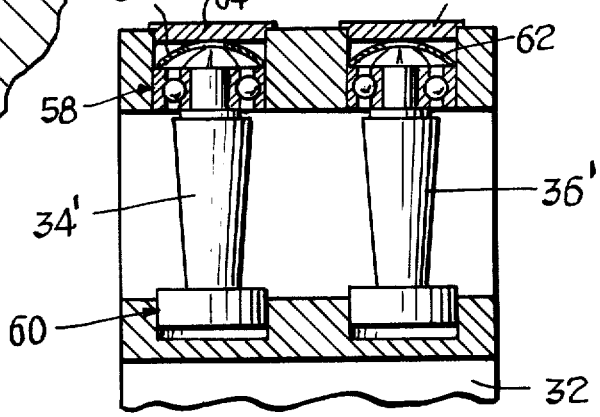
FIG. 7 is a fragmentary sectional view of a peripheral portion of the nutator member, illustrating the spring-biasing of the tapered rollers thereof.

In FIGS. 1 and 2 the rollers 34, 36 of the nutator 32 are illustrated as being cylindrical for simplicity of illustration. However, as provided by the present invention, the rollers are advantageously of tapered configuration as shown in FIG. 7, and are spring-biased radially inwardly in order to take up slack and looseness, and to prevent lost motion between the rollers and the toothed formations of the rotary members 24, 26. As seen in FIG. 7, the nutator 32 has the rows of tapered bearings 34', 36' which are carried in suitable outermost and innermost antifriction bearing assemblages 58, 60 respectively. The bearings assemblages 58, 60 can be axially movable or slidable in the supporting structure of the nutator 32, and the assemblages 58 are acted on by bowed spring washers 62 which are backed up by closure disks 64 at the periphery of the nutator 32. The result is that the rollers 34', 36' are spring-biased radially inward or downward as viewed in FIG. 7. In consequence, due to their tapered configuration they will seek and maintain positions wherein they can continually engage the contours of the thread formations of the rotary members 24, 26 during the intervals of engagement therewith. It will be understood that the total amount of axial movement of the bearings 58, 60 and rollers 34', 36' can be extremely small, as measured in thousandths of an inch, while still enabling slack to be taken up, this being due to the appreciable taper given the rollers.

Further, in accordance with the present invention, the number of rollers 36' is made to differ from the number of rollers 34', as seen in FIG. 1 where the rollers 34 are not located in registration with the rollers 36. By such arrangement a double speed reduction is had, since not only is there a speed reduction due to the differing numbers of teeth 38, 40 but also a reduction due to the differing numbers of the rollers 34, 36. This is an important feature of the invention, since it enables a much greater reduction in speed to be obtained with a given set of components, namely rotary members and nutator.

The above described structures are illustrated in the embodiment of the invention depicted in FIG. 1. Additionally, in this figure the rotary toothed member 26 is shown as being capable of turning movement in either of opposite directions, as effected by its securement to a worm gear 68 which is engaged by a worm 70 carried on a shaft 72 which is mounted in the stationary casing 74. The shaft 72 has a pinion 76 adapted for engagement with a cooperable spur gear (not shown) whereby a drive can be imparted to the shaft 72 and worm 70, thereby to effect rotary movement of the toothed member 26 in either of opposite directions.

By driving the pinion 76 through a variable speed drive, the speed of turning of the member 26 can also be varied, and by such arrangement it is possible to get an infinite variation of the speed reduction as effected by the nutator 32. A variation of such driving of the rotary member 26 is illustrated in FIG. 3, wherein a shaft 72' has a bevel gear 78 engageable with a cooperable bevel gear 80 which is driven by a spur gear 82 meshing with a second spur gear 84 rigidly affixed to the input drive shaft 20. By such arrangement a different speed ratio can be had, as effected by the nutator 32, although the organization of FIG. 2 does not illustrate variation of such speed. Alternatively, the bevel gear 78 can be made to mesh with another bevel gear 86 as shown in broken outline, carried on a shaft 88 which is driven by a spur gear 90 meshing with a second spur gear 92 that is keyed to the output shaft 22. With such arrangement a still different speed ratio can be obtained by virtue of the rotary member 26 being driven from the output shaft 22, as contrasted with its being driven from the input shaft 20 as shown in full lines.

Figure 8:
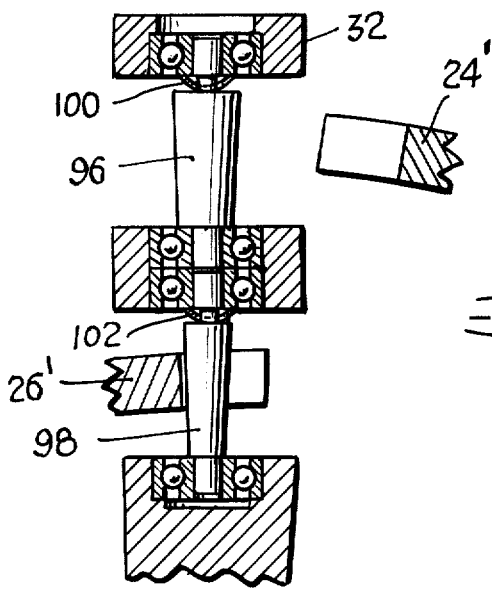
FIG. 8 is a fragmentary radial sectional view of peripheral portions of the nutator member and the adjoining rotary members, illustrating another embodiment of the invention.

Another embodiment of the invention is illustrated in FIG. 8, wherein the nutator 32 has tapered rollers 96, 98 arranged in concentric circular rows and engageable with toothed rotary members 24', 26' the latter being of smaller diameter than the member 24'. The rollers 96, 98 are tapered, and are spring-biased radially inward by means of bowed spring washers 100, 102 respectively. Thus, looseness or lost motion is eliminated without resorting to critical machine operations.

Yet another embodiment of the invention is illustrated in FIG. 9, wherein a normally stationary rotary member 26'' has affixed to it a spiral spur or worm gear 106 which is engaged to be driven by a worm 108 carried on a shaft 110 supported by the stationary casing 74 of the mechanism. At the exterior of the casing the shaft 10 has a brake drum 112 which is engaged by a brake shoe 114 carried by the casing 74, thereby in effect constituting a clutch by which the member 26'' can be locked in a stationary condition. The worm drive is reversible, such that release of the brake shoe 114 will enable the rotary member 26'' to have free wheeling movement and to be freely movable about the input shaft 20.

Disposed concentrically within the rotary member 26'' is an additional toothed rotary member 118 adapted for example to be cooperable with the rollers 98 illustrated in FIG. 8 whereas the rotary member 26'' is cooperable with the rollers 96. The toothed member 118 is affixed to a spiral worm or spur gear 120 which is engageable with a worm 122 carried on a shaft 124 mounted in the casing 74. At the exterior of the casing 74 the shaft 124 has a brake drum 126 which is engaged by a brake shoe 128 by which it can be locked against movement, such brake shoe being carried at the exterior and by the casing 74. With the above organization of FIG. 9 it is now seen that either of the toothed members 26'' or 118 can be locked against turning while the other member is permitted to have free wheeling. The members 26'' and 118 in cooperating with the nutator 32 represent a different ratio of speed reduction, and accordingly if one or the other of the toothed members is locked while the remaining one is free to turn, there can be had two different speed ratios by the same mechanism involving the single nutator 32.

It will now be seen from the foregoing that we have provided a novel and improved nutator-type speed reduction mechanism having a number of distinct advantages. By a unique counterbalancing with weights there is greatly minimized stresses in the components and vibration due to unbalance. This makes possible higher operating speeds, and parts of lesser strength, smaller size and weight. Further, looseness or lost motion between the nutator and cooperable members is eliminated by the use of spring-biased rollers engaging cooperable teeth or shoulders. By imparting a drive to the toothed member normally considered as stationary, an infinitely variable speed change can be had. Or different ratios can be had as a function of the speed of the input shaft, or the speed of the output shaft. By the use different numbers or rollers in the two circular rows on the nutator, a much greater speed reduction can be had, as well. Also, by the use of multiple rotary toothed members either of which can be free wheeling while the other is locked stationary, two separate, discrete speed ratios can be had with the same mechanism, using the single nutator member.

Variations and modifications are possible without departing from the spirit of the invention.

We claim:

1. A speed change mechanism comprising, in combination:
   a. a shaft,
   b. a nutator member carried by the shaft at a location intermediate free portions of the latter and defining a plane which is oblique with respect to said shaft,
   c. bearings supporting the shaft at locations beyond said free portions, enabling the shaft to have turning movements,
   d. means for causing said member to nutate in response to turning of the shaft, said means tending to cause a longitudinal flexing of said free portions of the shaft,
   e. a rotary member adjoining said mutator member, said rotary member being carried by the shaft between a free portion thereof and one of said bearings,
   f. said members having coengaging portions to effect a drive therebetween as the nutator member nutates, and
   g. weight means carried by the shaft on the free portions thereof, acting on the shaft as it rotates, to oppose the longitudinal shaft-flexing tendency of said nutating means.

2. A speed change mechanism as in claim 1, wherein:
   a. the shaft comprises a straight bar,
   b. the means for causing the nutator member to nutate comprises a hub disposed obliquely on said shaft, said member being rotatably carried by said hub,
   c. said weight means comprising a weight carried by the shaft and disposed with its center of gravity spaced from the axis of the shaft.

3. A mechanism as in claim 2, wherein:
   a. said weight adjoins the hub on the shaft, and extends in closely spaced relation to the plane of the nutator member.

4. A mechanism as in claim 1, wherein:
   a. the shaft comprises a straight bar,
   b. the means for causing the nutator member to nutate comprises a hub disposed obliquely on said shaft, said nutator member being rotatably carried by said hub,
   c. said weight means comprising a pair of weights carried by the shaft on opposite sides of the hub in closely spaced relation to the plane of the nutator member and disposed with their centers of gravity spaced from and located on opposite sides of the axis of the shaft.

5. A mechanism as in claim 4, wherein:
   a. said weights adjoin the hub and have portions encircling said shaft.

6. A mechanism as in claim 5, wherein:
   a. the nutator member comprises an annulus, b. said weights being of semi-circular configuration and having a wedge-like cross section.

7. A mechanism as in claim 6, wherein:
a. said nutator member is disposed obliquely on the shaft whereby a pair of intervening spaces exists between portions of the shaft and nutator member,
b. said weights occupying areas of said intervening spaces.

8. A speed change mechanism as in claim 1, and further including:
a. an output member, and
b. means for transferring power to said output member from the nutator member as the latter nutates.

9. A mechanism as in claim 8, wherein:
a. the means for transferring power comprises circular rows of shoulders on the output and nutator members, arranged to be cooperable with each other,
b. the coengaging portions of the nutator and rotary members comprising circular rows of cooperable shoulders on the members,
c. the shoulders on said rotary member differing in number from the shoulders on the output member.

10. A mechanism as in claim 8, wherein:
a. the means for transferring power comprises circular rows of shoulders on the output and nutator members, arranged to be cooperable with each other,
b. the coengaging portions of the nutator and rotary members comprising circular rows of cooperable shoulders on the members,
c. the total number of shoulders on said members being divided between the members in a manner that the speed of said shaft is different from the speed of the output member.

11. A speed change mechanism comprising, in combination:
a. a shaft,
b. a nutator member,
c. means for causing said member to nutate in response to turning of the shaft,
d. a rotary member adjoining one side of said nutator member,
e. one of said members having a toothed portion and the other member having a plurality of tapered rollers engageable with said toothed portion to effect a driving connection between the members, and
f. means biasing said rollers axially, said means tending to advance the large-diameter portions thereof toward the said toothed member portion so as to take up clearances between the members.

12. A mechanism as in claim 11, wherein:
a. said biasing means comprises bowed spring washers,
b. anti-friction bearing assemblages carrying said rollers,
c. said spring washers engaging said bearing assemblages to effect the biasing of the rollers.

13. A speed change mechanism as in claim 11, and further including:
a. a second rotary member adjoining the other side of the nutator member,
b. drive means between the second rotary member and the nutator member, comprising teeth on one member and conical rollers disposed on the other member and cooperable with said teeth, and
c. means biasing the conical rollers axially, said means tending to advance the large-diameter portions thereof toward said teeth so as to take up clearance between the same.

14. A mechaism as in claim 13, and further including:
a. anti-friction bearing assemblages carrying said tapered rollers and said conical rollers,
b. said biasing means comprising bowed spring washers engaged with the bearing assemblages to effect biasing of the rollers.

15. A speed change mechanism comprising, in combination:
a. a shaft,
b. a nutator member,
c. means for causing nutation of said member in response to turning of the shaft,
d. a pair of rotary members adjoining opposite sides of the nutator member,
e. means providing a drive between the nutator member and said rotary members, said means including a pair of circular rows of shoulders on the nutator member,
f. the shoulders of one circular row being different in number from the shoulders of the other circular row.

16. A mechanism as in claim 15, wherein:
a. the drive-providing means comprises circular rows of shoulders on said rotary members, cooperable with the shoulders on the nutator member,
b. the shoulders on one rotary member being different in number from the shoulders on the other rotary member.

17. A speed change mechanism comprising, in combination:
a. a shaft
b. a nutator member,
c. means for causing nutation of said member in response to turning of the shaft,
d. a pair of rotary members adjoining and disposed at one side of the nutator member,
e. means providing drives between the nutator member and said rotary members,
f. means for controlling the rotary motion of said rotary members,
g. a third rotary member, disposed on the other side of the nutator member, and
h. means for transferring power to said third rotary member from the nutator member as the latter nutates.

18. A speed change mechanism as in claim 17, and further including:
a. a stationary base,
b. said means for controlling the rotary motion of said pair of rotary members comprising cooperable gears carried by the base and said pair of members.

19. A speed change mechanism as in claim 17, and further including:
a. a stationary base,
b. said means for controlling the rotary motion of said pair of rotary members comprising brake devices carried by the base and operable against said pair of members.

20. A speed change mechanism comprising, in combination:
a. a shaft,
b. a nutator member,
c. means for causing nutation of said member in response to turning of the shaft, d. a pair of rotary members adjoining opposite sides of the nutator member,
e. means providing a drive between the nutator member and said rotary members, said means including a pair of circular rows of shoulders on the nutator member,
f. the shoulders of one circular row being different in number from the shoulders of the other circular row,
g. the shoulders of the circular rows comprising rollers, and
h. anti-friction bearing assemblages rotatably mounting the rollers on the nutator member.

* * * * *